United States Patent
Hun et al.

(10) Patent No.: US 10,836,678 B2
(45) Date of Patent: Nov. 17, 2020

(54) HIGH-PERFORMANCE CONCRETE MIX FOR PRECAST WYTHES

(71) Applicants: UT-BATTELLE, LLC, Oak Ridge, TN (US); University of Tennessee at Chattanooga, Chattanooga, TN (US)

(72) Inventors: Diana E. Hun, Lenoir City, TN (US); Catherine H. Mattus, Oak Ridge, TN (US); Mbakisya Onyango, Chattanooga, TN (US); Joseph Owino, Hixson, TN (US); Alex Brent Rollins, Dalton, GA (US)

(73) Assignees: UT-BATTELLE, LLC, Oak Ridge, TN (US); UNIVERSITY OF TENNESSEE RESEARCH FOUNDATION, Knoxville, TN (US)

( * ) Notice: Subject to any disclaimer, the term of this patent is extended or adjusted under 35 U.S.C. 154(b) by 0 days.

(21) Appl. No.: 16/383,058

(22) Filed: Apr. 12, 2019

(65) Prior Publication Data
US 2019/0315658 A1    Oct. 17, 2019

Related U.S. Application Data

(60) Provisional application No. 62/656,509, filed on Apr. 12, 2018.

(51) Int. Cl.

| | | |
|---|---|---|
| *C04B 28/06* | (2006.01) | |
| *C04B 14/10* | (2006.01) | |
| *C04B 18/02* | (2006.01) | |
| *C04B 14/42* | (2006.01) | |
| *E04C 2/04* | (2006.01) | |
| *C04B 103/22* | (2006.01) | |
| *C04B 103/30* | (2006.01) | |
| *C04B 111/40* | (2006.01) | |

(52) U.S. Cl.
CPC .......... *C04B 28/065* (2013.01); *C04B 14/106* (2013.01); *C04B 14/42* (2013.01); *C04B 18/027* (2013.01); *E04C 2/044* (2013.01); *C04B 2103/22* (2013.01); *C04B 2103/302* (2013.01); *C04B 2111/40* (2013.01); *C04B 2201/20* (2013.01); *C04B 2201/50* (2013.01)

(58) Field of Classification Search
CPC ... C04B 28/065; C04B 14/106; C04B 18/027; C04B 14/42; C04B 2201/20; C04B 2103/22; C04B 2103/302; C04B 2111/40; C04B 2201/50; C04B 28/04; E04C 2/044
See application file for complete search history.

(56) References Cited

U.S. PATENT DOCUMENTS

| | | | |
|---|---|---|---|
| 2012/0111235 A1* | 5/2012 | Han | C04B 28/04 106/708 |
| 2016/0060169 A1* | 3/2016 | Byrd | C04B 18/24 106/676 |
| 2018/0093920 A1* | 4/2018 | Calvin | C04B 14/106 |

FOREIGN PATENT DOCUMENTS

WO    WO-2017201607 A1 * 11/2017 ....... C04B 2103/603

OTHER PUBLICATIONS

Losch et al, "State of the Art of Precast/Prestressed Concrete Sandwich Wall Panels", PCI Journal 1997. (Year: 1997).*
Losch et al.: "State of the Art of Precast/Prestressed Concrete Sandwich Wall Panels" PCI Journal 1997.

* cited by examiner

*Primary Examiner* — Brian Handville
(74) *Attorney, Agent, or Firm* — Fox Rothschild LLP

(57) ABSTRACT

A lightweight concrete composition includes the concrete components, per $yd^3$ of concrete: Type III Portland cement ($lb/yd^3$) 200-900; metakaolin ($lb/yd^3$) 100-520; calcium sulfoaluminate cement (CSA) ($lb/yd^3$) 40-840; 3/8" lightweight expanded slate aggregate ($lb/yd^3$) 70-550; lightweight fine expanded slate aggregate ($lb/yd^3$) 300-550; expanded glass fine aggregate (0.5-1 mm) 35-90 ($lb/yd^3$); expanded glass fine aggregate (1-2 mm) 35-90 ($lb/yd^3$); water ($lb/yd^3$) 300-350; CSA cement set retarder 0.015 to 0.06 oz per lb of CSA cement; high-range water-reducing admixture 120-1000 (fl. $oz/yd^3$); hydration controlling admixture 0-80 (fl. $oz/yd^3$); reinforcing non-metallic lightweight fibers <1.5" in length 0-8 ($lb/yd^3$); wherein the concrete has a flexural strength of at least 600 psi at 12 hours, a density of 95 to 110 $lb/ft^3$, and a compressive strength at 28 days of at least 7,000 psi. A lightweight concrete wythe and method of making a lightweight concrete wythe are also disclosed.

15 Claims, No Drawings

HIGH-PERFORMANCE CONCRETE MIX FOR PRECAST WYTHES

CROSS-REFERENCE TO RELATED APPLICATIONS

This application claims priority to U.S. Provisional Application No. 62/656,509 filed on Apr. 12, 2018, entitled "High Performance Concrete Mix", the entire disclosure of which incorporated herein by reference.

STATEMENT REGARDING FEDERALLY SPONSORED RESEARCH AND DEVELOPMENT

This invention was made with government support under Contract No. DE-AC05-000R22725 awarded by the U.S. Department of Energy. The government has certain rights in this invention.

THE NAMES OF THE PARTIES TO A JOINT RESEARCH AGREEMENT

This invention was made under Cooperative Research and Development Agreement No. NFE-17-06558 between Precast/Prestressed Concrete Institute and UT-Battelle, LLC, management and operating contractor for the Oak Ridge National Laboratory for the United States Department of Energy. The government has certain rights in this invention.

FIELD OF THE INVENTION

The present invention relates to concrete compositions, and more particularly to concrete compositions that are suitable for lightweight precast wythes.

BACKGROUND OF THE INVENTION

Typical insulated precast concrete panels have concrete wythes with a minimum thickness of 2 inches. Concrete mixes used in these panels can have a flexural strength that is about 400 psi at 12 hours and a density on the order of 150 lb. per cubic foot. Such panels for exterior and interior concrete wythes can be 2 inches and 3 inches thick, respectively, and the weight of the panel is 62 lb. per square foot of wall area. There is a need in the precast industry to decrease the thickness of concrete wythes to 1.5 inches and the weight of the panel to about 25 lb. per square foot of wall area. This would dramatically decrease weight and corresponding production, transportation and installation time and cost.

SUMMARY OF THE INVENTION

A lightweight concrete composition can include the concrete components, per $yd^3$ of concrete:

| | |
|---|---|
| type III Portland cement ($lb/yd^3$) | 200-900 |
| metakaolin ($lb/yd^3$) | 100-520 |
| calcium sulfoaluminate cement (CSAC) ($lb/yd^3$) | 40-840 |
| ⅜" lightweight expanded slate aggregate ($lb/yd^3$) | 70-550 |
| lightweight fine expanded slate aggregate ($lb/yd^3$) | 300-550 |
| expanded glass fine aggregate 0.02 to 0.04" (0.5-1 mm) ($lb/yd^3$) | 35-90 |
| expanded glass fine aggregate 0.04 to 0.08" (1-2 mm) ($lb/yd^3$) | 35-90 |
| water ($lb/yd^3$) | 300-350 |
| CSA cement set retarder | 0.015 to 0.06 oz per lb of CSA cement |
| high-range water-reducing admixture (fl. $oz/yd^3$) | 120-1000 |
| hydration controlling admixture (fl. $oz/yd^3$) | 0-80 |
| reinforcing non-metallic lightweight fibers < 1.5" in length ($lb/yd^3$) | 0-8 |

The concrete can have a flexural strength of at least 600 psi at 12 hours, a density of 95 to 110 $lb/ft^3$, and a compressive strength at 28 days of at least 7,000 psi.

The concrete can consist essentially of the concrete components. The concrete can consist of the concrete components.

A lightweight concrete wythe can include the concrete components, per $yd^3$ of concrete:

| | |
|---|---|
| type III Portland cement ($lb/yd^3$) | 200-900 |
| metakaolin ($lb/yd^3$) | 100-520 |
| calcium sulfoaluminate cement ($lb/yd^3$) | 40-840 |
| ⅜" lightweight aggregate ($lb/yd^3$) | 70-550 |
| lightweight fine aggregate ($lb/yd^3$) | 300-550 |
| expanded glass fine aggregate 0.02 to 0.04" (0.5-1 mm) ($lb/yd^3$) | 35-90 |
| expanded glass fine aggregate 0.04 to 0.08" (1-2 mm) ($lb/yd^3$) | 35-90 |
| water ($lb/yd^3$) | 300-350 |
| CSA cement set retarder | 0.015 to 0.06 oz per lb of CSA cement |
| high-range water-reducing admixture (fl. $oz/yd^3$) | 120-1000 |
| hydration controlling admixture (fl. $oz/yd^3$) | 0-80 |
| reinforcing non-metallic lightweight fibers < 1.5" in length ($lb/yd^3$) | 0-8 | wherein the wythe has a flexural strength of at least 600 psi at 12 hours, a density of 95 to 110 $lb/ft^3$, and a compressive strength at 28 days of at least 7,000 psi.

A method of making a lightweight concrete wythe can include the step of providing concrete components comprising, per $yd^3$ of concrete:

| | |
|---|---|
| type III Portland cement ($lb/yd^3$) | 200-900 |
| metakaolin ($lb/yd^3$) | 100-520 |
| calcium sulfoaluminate cement ($lb/yd^3$) | 40-840 |
| ⅜" lightweight expanded slate aggregate ($lb/yd^3$) | 70-550 |
| lightweight fine expanded slate aggregate ($lb/yd^3$) | 300-550 |
| expanded glass fine aggregate 0.02 to 0.04" (0.5-1 mm) ($lb/yd^3$) | 35-90 |
| expanded glass aggregate 0.04 to 0.08" (1-2 mm) ($lb/yd^3$) | 35-90 |
| water ($lb/yd^3$) | 300-350 |
| CSA cement set retarder | 0.015 to 0.06 oz per lb of CSA cement |
| high-range water-reducing admixture (fl. $oz/yd^3$) | 120-1000 |
| hydration controlling admixture (fl. $oz/yd^3$) | 0-80 |
| reinforcing non-metallic lightweight fibers < 1.5" in length ($lb/yd^3$) | 0-8 |

The concrete is placed into a mold. The concrete is allowed to cure over a period of at least 12 hours to create a wythe. The wythe is removed from the mold. The wythe has a flexural strength of at least 600 psi at 12 hours, a density of 95 to 110 $lb/ft^3$, and a compressive strength at 28 days of at least 7,000 psi The wythe can be less than 2" in thickness. The wythe can have a thickness of no more than 1.5". The concrete can have a compressive strength at 28 days of from 7,000 to 10,000 psi.

DETAILED DESCRIPTION OF THE INVENTION

A concrete composition according to the invention can include the following concrete components, per yd$^3$ of concrete:

| | |
|---|---|
| type III Portland cement (lb/yd$^3$) | 200-900 |
| metakaolin (lb/yd$^3$) | 100-520 |
| calcium sulfoaluminate cement (CSAC) (lb/yd$^3$) | 40-840 |
| 3/8" lightweight expanded slate aggregate (lb/yd$^3$) | 70-550 |
| lightweight fine expanded slate aggregate (lb/yd$^3$) | 300-550 |
| expanded glass fine aggregate 0.02 to 0.04" (0.5-1 mm) (lb/yd$^3$) | 35-90 |
| expanded glass fine aggregate 0.04 to 0.08" (1-2 mm) (lb/yd$^3$) | 35-90 |
| water (lb/yd$^3$) | 300-350 |
| CSA cement set retarder | 0.015 to 0.06 oz per lb of CSA cement |
| high-range water-reducing admixture (fl. oz/yd$^3$) | 120-1000 |
| hydration controlling admixture (fl. oz/yd$^3$) | 0-80 |
| reinforcing non-metallic lightweight fibers < 1.5" in length (lb/yd$^3$) | 0-8 | wherein the concrete has a flexural strength of at least 600 psi at 12 hours, a density of 95 to 110 lb/ft$^3$, and a compressive strength at 28 days of at least 7,000 psi.

The concrete composition can consist essentially of these concrete components. The concrete composition can consist of these concrete components.

The concrete composition can include Type III Portland cement to provide high early strength. The amount of Type III cement can vary. Type III cement should have compressive strength equal or greater than 1700 psi at 1 day according to ASTM C150, and compressive strength equal or greater than 3400 psi at 3 days according to ASTM C150. The specific gravity can be about 3.15 g/cm$^3$. One such material is "Type III Portland cement" manufactured by Lafarge North America, Chicago, Ill.

The Type III cement can be from 200-900 lb per yd$^3$ of concrete. In one embodiment, the amount of Type III cement can be 800 lb/yd$^3$. The amount of Type III cement can be 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 780, 790, 800, 810, 820, 830, 840, 850, 860, 870, 880, 890, to 900 lb/yd$^3$, or within a range of any high value and low value selected from these values.

The concrete composition can include Metakaolin to provide densification of the paste for higher strength. Metakaolin is composed primarily of Kaolinite. Metakaolin binds large amounts of free lime in the form of stable CSH-phases in a cement paste. It sets in about 7 hours after combined with lime and water. The metakaolin should conform to ASTM C618. It has a specific density of about 2.6 g/cm$^3$. One such material is "Metapor", manufactured by "PORAVER North America, 2429 Bowman street, Innisfil, ON, L9S 3V6, Canada.

The amount of Metakaolin can vary. The amount of Metakaolin can be from 100 to 520 lb/yd$^3$ of concrete. In one embodiment, the amount of Metakaolin can be 200 lb/yd$^3$. The amount of the Metakaolin can be 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, to 520 lb/yd$^3$, or within a range of any high value and low value selected from these values.

The concrete composition includes calcium sulfoaluminate cement (CSAC) to provide high early strength. CSAC hydration produces aluminate hydrates such as ettringite and calcium monosulfoaluminate instead of Portlandite (Ca(OH)$_2$). The CSAC very rapidly develops high strength because of the instant formation of ettringite. The CSAC has a compressive strength according to ASTM C1600. The compressive strength of CSAC is equal or greater than 3100 psi at 1.5 hours, equal or greater than 3800 psi at 3 hours according to ASTM C1600, and equal or greater than 5100 psi at 1 day according to ASTM C1600. One such material is "Rapid Set Cement" from CTS Cement Manufacturing Corp, Garden Grove, Calif.

The amount of CSAC can vary. The amount of CSAC can be from 40 to 840 lb/yd$^3$ of concrete. In one embodiment, the amount of CSAC is 40 lb/yd$^3$. The amount of CSAC can be 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, to 840 lb/yd$^3$, or within a range of any high value and low value selected from these values.

Aggregates that are light in weight are used to decrease the density of the concrete of the invention to 95 to 110 lb/ft$^3$. The lightweight aggregates can vary. Aggregate sizes and type can be 3/8 inch lightweight expanded slate aggregate, lightweight fine expanded slate aggregate, 1-2 mm expanded glass lightweight fine aggregate, and 0.5-1 mm expanded glass lightweight fine aggregate. Other light weight aggregates are possible.

The concrete composition can include 3/8 inch lightweight expanded slate aggregate to decrease the density of the concrete composition. The 3/8 inch lightweight expanded slate aggregate can be suitable lightweight aggregate for structural applications. This aggregate can provide, as an example, a compressive strength greater than 4400 psi according to ASTM C330, bulk density (loose) of ~47 pcf, dry specific gravity is less or equal to 1.54 pcf according to ASTM C127, saturated surface dry specific gravity is 1.57 to 1.64 pcf according to ASTM C127, absorption after 24-hour soak according to ASTM C127 is less or equal to 7.3%, and absorption after 72-hour soak according to ASTM C127 is less or equal to 7.9%. One such material is "3/8 structural lightweight aggregate", manufactured by STALITE in Salisbury, N.C.

The amount of the 3/8 inch lightweight expanded slate aggregate can vary. The 3/8 in lightweight aggregate can be 70-550 lb/yd$^3$ of concrete. In one embodiment, the amount of 3/8 inch lightweight aggregate can be 485 lb/yd$^3$. The amount of the 3/8 lightweight aggregate can be 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, to 550 lb/yd$^3$, or within a range of any high value and low value selected from these values.

The concrete composition can include lightweight fine aggregate to decrease the density of the concrete composition. The lightweight sand or fine aggregate can be expanded slate with diameter equal or less than ~0.19 in, and can be according to ASTM C33. This aggregate can provide, for example, a compressive strength greater than 3400 psi according to ASTM C330, a bulk density (loose) of ~58 pcf, dry specific gravity is less or equal to 1.69 pcf according to ASTM C127, saturated surface dry specific gravity is 1.75 to 1.85 pcf according to ASTM C127, and absorption after 72-hour soak according to ASTM C127 is less or equal to 11.5%. One such material is "structural fine lightweight aggregate" from STALITE in Salisbury, N.C.

The amount of lightweight fine aggregate can vary. The lightweight fine aggregate can be from 300-550 lb/yd$^3$ of concrete. In one embodiment, the lightweight fine aggregate can be 545 lb/yd$^3$. The amount of the lightweight fine aggregate can be 300, 310, 320, 330, 340, 350, 360, 370, 380, 390, 400, 410, 420, 430, 440, 450, 460, 470, 480, 490, 500, 510, 520, 530, 540, to 550 lb/yd$^3$, or within a range of any high value and low value selected from these values.

The concrete composition can include 0.5-1 mm expanded glass lightweight fine aggregate to decrease the density of the concrete composition. This aggregate can have, as an example, a compressive strength greater than 290 psi according to DIN EN 13055-1, bulk density (loose) of ~16.9 lb/ft$^3$ according to ASTM C9/C29M, and apparent density of 32.5 lb/ft$^3$ according to ASTM C128. Water absorption according to ASTM C128 is about 27%. One such material is PORAVER expanded glass granules 0.5-1 mm from PORAVER North America, 2429 Bowman street, Innisfil, ON, L9S 3V6, Canada.

The amount of 0.02 to 0.04 in (0.5-1 mm) expanded glass lightweight fine aggregate can vary. The amount of 0.5-1 mm lightweight fine aggregate can be from 35 to 90 lb/yd$^3$ of concrete. In one embodiment, the amount of 0.5-1 mm expanded glass lightweight fine aggregate can be 35 lb/yd$^3$. The amount of 0.5-1 mm expanded glass lightweight fine aggregate can be 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, to 90 lb/yd$^3$, or within a range of any high value and low value selected from these values.

The concrete composition can include 1-2 mm (0.04 to 0.08 in) expanded glass lightweight fine aggregate. This aggregate can have, as an example, a compressive strength greater than 232 psi according to DIN EN 13055-1, bulk density (loose) of about 14.4 lb/ft$^3$ according to ASTM C9/C29M, and apparent density of 25 lb/ft$^3$ according to ASTM C128. Water absorption according to ASTM C128 is about 26%. One such material is PORAVER expanded glass granules 1-2 mm from PORAVER North America, 2429 Bowman street, Innisfil, ON, L9S 3V6, Canada.

The amount of 1-2 mm expanded glass lightweight fine aggregate can vary. The amount of 1-2 mm expanded glass lightweight fine aggregate can be from 35 to 90 lb/yd$^3$ of concrete. In one embodiment, the amount of 1-2 mm expanded glass lightweight fine aggregate can be 35 lb/yd$^3$. The amount of the expanded glass fine aggregate can be 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, to 90 lb/yd$^3$, or within a range of any high value and low value selected from these values.

Water is necessary for the hydration of cement. The amount of water that is necessary can vary according to the cement composition and particularly the particle size of the cement, and also the conditions such as temperature during casting. The volume of the water can be 300, 310, 320, 330, 340, to 350 lb/yd$^3$ of concrete, or within a range of any high value and low value selected from these values. In one aspect, the volume of water is 300 lb/yd$^3$. The amount of water should be appropriate for the cement hydration, but the water/cementitious ratio should remain between 0.25 to 0.30 to achieve the required mechanical properties.

The concrete composition can include a high-range water-reducing admixture. The high-range water-reducing admixture reduces the water content required for a given workability, and therefore contributes to workability retention and higher concrete strength since less water is used. The high-range water-reducing admixture is used to reduce the ratio of water to cementitious materials to 0.25 to 0.30. The lower the W/C ratio, the higher the concrete strengths developed. The high-range water-reducing admixture allows for increasing workability at a given W/C ratio. The high-range water-reducing admixture can be polycarboxylate based. The high-range water-reducing admixture should comply with ASTM C494 requirements for Type A, water-reducing, and Type F, high-range water-reducing, admixtures. Such materials are MasterGlenium® 7920 and MasterGlenium® 7700 from BASF Corporation in Cleveland, Ohio.

The amount of high-range water-reducing admixture can vary. In one aspect, the amount of high-range water-reducing admixture is 225 fl. oz/yd$^3$ of concrete. The quantity of high-range water-reducing admixture can be 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, to 1000 fl. oz/yd$^3$, or within a range of any high value and low value selected from these values.

The concrete composition can sometimes include a hydration-controlling admixture. The hydration-controlling admixture increases the workability time of the concrete. The hydration controlling admixture controls hydration of cementitious materials. The hydration controlling admixture should meet ASTM C 494/C 494M requirements for Type B, retarding, and Type D, water-reducing and retarding, admixtures. One such material is MasterSet DELVO from BASF Corporation in Cleveland, Ohio.

The amount of hydration-controlling admixture can vary. In one aspect, the amount of hydration-controlling admixture is 32 fl. oz/yd$^3$ of concrete. The density of the hydration-controlling admixture can be 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, to 80 fl oz/yd$^3$, or within a range of any high value and low value selected from these values.

The concrete composition includes fibers to reduce desiccation cracking. Various lightweight non-metallic fibers can be used such as basalt, polyvinyl alcohol (PVA) and glass. Steel should be avoided. The fibers can have varying diameters and lengths. The fibers should be less than 1.5 inches in length to prevent the fibers from bundling together during mixing and to prevent decreases in workability. The fibers can be ⅛, ¼, ⅜, ½, ⅝, ¾, ⅞, 1, 1⅛, 1¼, or 1⅜ inches long, or within a range of any high value or low value selected from these values. In one aspect, fiber made of ⅜ inch long monofilament polyvinyl alcohol fibers can be used. The fibers can bond at the molecular level with or be embedded within the concrete. Examples of fibers include: NYCON-PVA RECS15 from Nycon Headquarters, Fairless Hills, Pa.; Cem-FIL® glass fiber from Owens Corning, Toledo, Ohio; and Basfiber® from Kamenny Vek and distributed by B & W Fiberglass, Shelby, N.C. The fibers can meet ASTM C1116. The PVA fibers can have a specific gravity of 1.3 g/cm$^3$, a tensile strength of 240 ksi, and a flexural strength of 5700 ksi.

The amount of fiber can vary. In one embodiment, the amount of fiber was 4.1 lb/yd$^3$ of concrete. The amount fibers can be 0, 1, 2, 3, 4, 5, 6, 7 to 8 lb/yd$^3$, or within a range of any high value and low value selected from these values.

A cement composition can include a set retarder for CSA cement. The CSA cement set retarder extends the workability window for CSA cement. Without the set control, the CSA hardens within ~15 minutes. Adding the set control helps to keep the workability for longer period of time. The weight of the CSA cement set retarder in the concrete composition can vary. The amount of CSA cement set retarder can be from 0.015 to 0.06 oz per lb of CSA cement. The amount of CSA set retarder can be 0.015, 0.020, 0.025, 0.030, 0.035, 0.040, 0.045, 0.050, 0.055, to 0.060 oz per lb of CSA cement, or within a range of any high value and low value selected from these values. The set retarder for CSA cement that is used can vary. One such material is SET Control® from CTS Cement Manufacturing Corp in Garden Grove, Calif.

The concrete compositions according to the invention have a compressive strength at 28 days of at least 7,000 psi. The concrete compositions of the invention can have a compressive strength at 28 days of at least 7000, 7100, 7200, 7300, 7400, 7500, 7600, 7700, 7800, 7900, 8000, 8100, 8200, 8300, 8400, 8500, 8600, 8700, 8800, 8900, 9000, 9100, 9200, 9300, 9400, 9500, 9600, 9700, 9800, 9900, and 10000 psi, or within a range of any high value and low value selected from these values.

A lightweight concrete wythe according to the invention can be fabricated according to known precast concrete fabrication methods. Lightweight wythes made according to the invention can also be transported and installed by known precast wythe transportation and installation methods. Lightweight wythes according to the invention can be used in installations where precast wythes are utilized.

EXAMPLES

Concrete compositions according to the invention were prepared and tested. The compositions and the respective test results are provided in Table 1.

Mixes 20, 21 and 23 in Table 1 were produced in small batches of about 0.15-0.3 cubic ft at the University of Tennessee at Chattanooga, in Chattanooga, Tenn. The components were mixed at room temperature as follows. About 50 percent of the batch water was poured into the mixer followed by the expanded glass fine aggregate, lightweight fine expanded slate aggregate, and ⅜ inch lightweight expanded slate aggregate; these components were mixed for about one minute. Thereafter, the cementitious components were added and mixed in the following order: Type III cement, Metakaolin, and CSA cement. The mixer was stopped and the remaining batch water and the hydration controlling admixture were added. The mixer was started again and the high-range water-reducing admixture was added. Mixing continued for about five minutes until the mixture was uniform and flowable. After mixing for about four minutes, the fibers were added and then allowed to mix in for at least one minute.

The large-scale batch of about three cubic yards was produced at Gate Precast in Ashland City, Tenn. The order in which the components were mixed at room temperature was as follows. The lightweight fine expanded slate aggregate and the ⅜ inch lightweight expanded slate aggregate were combined in the mixer and the mixer was stopped afterwards. The expanded glass fine aggregate, Metakaolin, CSA cement, and Type III cement were added to the mixture, mixed in, and the mixer was stopped. Initial water was added to the mixture, the mixer was started, and the hydration controlling admixture, the high-range water-reducing admixture, and the remaining water were added to the mix. Lastly, the lightweight non-metallic fibers were sprinkled in while the mixer was running.

TABLE 1

| Constituents per cubic yard of concrete | Mix 20 (small batch) | Mix 21 (small batch) | Mix 23 (small batch) | Large batch |
|---|---|---|---|---|
| Type III cement (lb/yd$^3$) | 700 | 900 | 800 | 800 |
| Metakaolin (lb/yd$^3$) | 300 | 100 | 200 | 200 |
| Calcium sulfoaluminate cement (lb/yd$^3$) | 40 | 40 | 40 | 40 |
| ⅜" lightweight aggregate (lb/yd$^3$) | 500 | 507 | 485 | 485 |
| Lightweight fine aggregate (lb/yd$^3$) | 545 | 545 | 545 | 545 |
| Expanded glass fine aggregate 0.02 to 0.04" (lb/yd$^3$) | 35 | 35 | 35 | 35 |
| Expanded glass fine aggregate 0.04 to 0.08" (lb/yd$^3$) | 35 | 35 | 35 | 35 |
| High-range water-reducing admixture (fl oz/yd$^3$) | 220.3 | 205.4 | 225.4 | 225.4 |
| Hydration controlling admixture (fl oz/yd$^3$) | 21 | 32 | 32 | 32 |
| Reinforcing glass fibers | 0 | 0 | 0 | 4.1 |
| Water (lb/yd$^3$) | 300 | 300 | 300 | 300 |

TABLE 1-continued

Test Concrete Compositions

| Constituents per cubic yard of concrete | Mix 20 (small batch) | Mix 21 (small batch) | Mix 23 (small batch) | Large batch |
|---|---|---|---|---|
| Set control for CSA cement | | | | |
| Water/cement ratio | 0.288 | 0.288 | 0.288 | 0.288 |
| Density (pcf) (ASTM C567) | 102.4 | 102.7 | 98.9 | 108 |
| Flexural strength (psi) at 12 hours (ASTM C78) | 600 | 750 | 610 | 600, 670, 810 |
| Compressive strength (psi) at 28 days (ASTM C39) | 7000 | 7190 | 7640 | 8075 |

The concrete compositions described in detail herein disclose compositions for illustrating embodiments of the present invention. It is to be understood however, that other compositions and arrangements thereof, other than those illustrated and described may be employed for providing a concrete composition in accordance with the spirit of the invention, and such changes, alternations and modifications as would occur to those skilled in the art are considered to be within the scope of this invention as broadly defined in the appended claims. The invention is capable of other embodiments and of being practiced and carried out in various ways. In addition, it is to be understood that the phraseology and terminology employed herein are for the purpose of description and should not be regarded as limiting. With respect to the above description then, it is to be realized that the compositions of the invention include variations in composition that are encompassed by the present invention.

We claim:

1. A lightweight concrete composition, comprising the concrete components, per $yd^3$ of concrete:

| | |
|---|---|
| type III Portland cement ($lb/yd^3$) | 200-900 |
| metakaolin ($lb/yd^3$) | 100-520 |
| calcium sulfoaluminate cement (CSA) ($lb/yd^3$) | 40-840 |
| ⅜" lightweight expanded slate aggregate ($lb/yd^3$) | 70-550 |
| lightweight fine expanded slate aggregate ($lb/yd^3$) | 300-550 |
| expanded glass fine aggregate 0.02 to 0.04" (0.5-1 mm) ($lb/yd^3$) | 35-90 |
| expanded glass fine aggregate 0.04 to 0.08" (1-2 mm) ($lb/yd^3$) | 35-90 |
| water ($lb/yd^3$) | 300-350 |
| CSA cement set retarder | 0.015 to 0.06 oz per lb of CSA cement |
| high-range water-reducing admixture (fl. $oz/yd^3$) | 120-1000 |
| hydration controlling admixture (fl. $oz/yd^3$) | 0-80 |
| reinforcing non-metallic lightweight fibers < 1.5" in length ($lb/yd^3$) | 0-8 | wherein the concrete has a flexural strength of at least 600 psi at 12 hours, a density of 95 to 110 $lb/ft^3$, and a compressive strength at 28 days of at least 7,000 psi.

2. The concrete composition of claim 1, consisting essentially of the concrete components.

3. The concrete composition of claim 1, consisting of the concrete components.

4. The concrete of claim 1, wherein:

| | |
|---|---|
| type III Portland cement ($lb/yd^3$) | 800 |
| metakaolin ($lb/yd^3$) | 200 |
| calcium sulfoaluminate cement ($lb/yd^3$) | 40 |
| ⅜" lightweight expanded slate aggregate($lb/yd^3$) | 485 |
| lightweight fine expanded slate aggregate ($lb/yd^3$) | 545 |
| expanded glass fine aggregate 0.02 to 0.04" (0.5-1 mm) ($lb/yd^3$) | 35 |
| expanded glass fine aggregate 0.04 to 0.08" (1-2 mm) ($lb/yd^3$) | 35 |
| water ($lb/yd^3$) | 300 |
| CSA cement set retarder | 0.015 to 0.06 oz per lb of CSA cement |
| high-range water-reducing admixture (fl. $oz/yd^3$) | 225.4 |
| hydration controlling admixture (fl. $oz/yd^3$) | 32 |
| reinforcing non-metallic lightweight fibers < 1.5" in length ($lb/yd^3$) | 4.1 |

5. The concrete of claim 1, wherein the concrete has a compressive strength at 28 days of from 7,000 to 10,000 psi.

6. A lightweight concrete wythe, comprising the concrete components, per $yd^3$ of concrete:

| | |
|---|---|
| type III Portland cement ($lb/yd^3$) | 200-900 |
| metakaolin ($lb/yd^3$) | 100-520 |
| calcium sulfoaluminate cement ($lb/yd^3$) | 40-840 |
| ⅜" lightweight expanded slate aggregate ($lb/yd^3$) | 70-550 |
| lightweight fine expanded slate aggregate ($lb/yd^3$) | 300-550 |
| expanded glass fine aggregate 0.02 to 0.04" (0.5-1 mm) ($lb/yd^3$) | 35-90 |
| expanded glass fine aggregate 0.04 to 0.08" (1-2 mm) ($lb/yd^3$) | 35-90 |
| water ($lb/yd^3$) | 300-350 |
| CSA cement set retarder | 0.015 to 0.06 oz per lb of CSA cement |
| high-range water-reducing admixture (fl. $oz/yd^3$) | 120-1000 |
| hydration controlling admixture (fl. $oz/yd^3$) | 0-80 |
| non-metallic lightweight fibers < 1.5" in length ($lb/yd^3$) | 0-8 | wherein the wythe has a flexural strength of at least 600 psi at 12 hours, a density of 95 to 110 $lb/ft^3$, and a compressive strength at 28 days of at least 7,000 psi.

7. The concrete wythe of claim 6, wherein the wythe has a thickness of less than 2".

8. The concrete wythe of claim 6, wherein the wythe has a thickness of no more than 1.5".

9. The concrete wythe of claim 6, wherein the wythe consists essentially of the concrete components.

10. The concrete wythe of claim 6, wherein the wythe consists of the concrete components.

11. The concrete wythe of claim 6, wherein the concrete wythe has a compressive strength at 28 days of from 7,000 to 10,000 psi.

12. A method of making a lightweight concrete wythe, comprising the steps of:

providing concrete components comprising, per $yd^3$ of concrete:

| | |
|---|---|
| type III Portland cement (lb/yd³) | 200-900 |
| metakaolin (lb/yd³) | 100-520 |
| calcium sulfoaluminate cement (lb/yd³) | 40-840 |
| ⅜" lightweight expanded slate aggregate (lb/yd³) | 70-550 |
| lightweight fine expanded slate aggregate (lb/yd³) | 300-550 |
| expanded glass fine aggregate 0.02 to 0.04" (0.5-1 mm) (lb/yd³) | 35-90 |
| expanded glass aggregate 0.04 to 0.08" (1-2 mm) (lb/yd³) | 35-90 |
| water (lb/yd³) | 300-350 |
| CSA cement set retarder | 0.015 to 0.06 oz per lb of CSA cement |
| high-range water-reducing admixture (fl. oz/yd³) | 120-1000 |
| hydration controlling admixture (fl. oz/yd³) | 0-80 |
| reinforcing non-metallic lightweight fibers < 1.5" in length (lb/yd³) | 0-8 | placing the concrete into a mold;
allowing the concrete to cure over a period of at least 12 hours to create a wythe;
removing the wythe from the mold;
wherein the wythe has a flexural strength of at least 600 psi at 12 hours, a density of 95 to 110 lb/ft³, and a compressive strength at 28 days of at least 7,000 psi.

13. The method of claim 12, wherein the wythe is less than 2" in thickness.

14. The method of claim 12, wherein the wythe has a thickness of no more than 1.5".

15. The method of claim 12, wherein the concrete has a compressive strength at 28 days of from 7,000 to 10,000 psi.

\* \* \* \* \*